(12) United States Patent
Qin et al.

(10) Patent No.: US 11,749,955 B2
(45) Date of Patent: Sep. 5, 2023

(54) CONNECTOR AND ELECTRONIC DEVICE

(71) Applicant: SHENZHEN POWEROAK NEWENER CO., LTD, Shenzhen (CN)

(72) Inventors: Geng Qin, Shenzhen (CN); Xiaojie Huang, Shenzhen (CN); Hui Ma, Shenzhen (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 0 days.

(21) Appl. No.: 17/895,401

(22) Filed: Aug. 25, 2022

(65) Prior Publication Data
US 2023/0060195 A1  Mar. 2, 2023

Related U.S. Application Data

(63) Continuation of application No. PCT/CN2022/081479, filed on Mar. 17, 2022.

(30) Foreign Application Priority Data

Aug. 24, 2021 (CN) .......................... 202110971239.3

(51) Int. Cl.
*H01R 13/70* (2006.01)
*H01R 4/28* (2006.01)
(Continued)

(52) U.S. Cl.
CPC .............. *H01R 13/70* (2013.01); *H01R 4/28* (2013.01); *H01R 13/516* (2013.01); *H01R 13/6275* (2013.01); *H01R 13/6691* (2013.01)

(58) Field of Classification Search
CPC ........ H01R 13/70; H01R 4/28; H01R 13/516; H01R 13/6691; H01R 13/5213;
(Continued)

(56) References Cited

U.S. PATENT DOCUMENTS

| | | | | |
|---|---|---|---|---|
| 2012/0129378 A1* | 5/2012 | Kiko | ....................... | B60L 53/31 362/555 |
| 2012/0171900 A1* | 7/2012 | Sebald | ............... | H01R 13/5227 29/874 |
| 2013/0260595 A1* | 10/2013 | Tamaki | .............. | H01R 13/6272 439/345 |

FOREIGN PATENT DOCUMENTS

CN  209552973 U  10/2019

\* cited by examiner

*Primary Examiner* — Travis S Chambers
(74) *Attorney, Agent, or Firm* — IPRO, PLLC

(57) ABSTRACT

A connector includes a housing provided with an accommodating cavity and a first opening communicating with the accommodating cavity; a circuit board disposed in the accommodating cavity and provided with a first signal connection point; a connection head disposed on the housing and including a second signal connection point for external device connection; and a switch disposed in the first opening, being respectively connected to the first signal connection point and the second signal connection point. The switch is used for controlling the connection or disconnection between the first signal connection point and the second signal connection point. In the above-mentioned manner, the connector and a heavy load may be disconnected by the switch when the connector is pulled out, so that risks of instant ignition and short circuit caused by the connector pulled out may be avoided, and safety accidents may be reduced.

18 Claims, 5 Drawing Sheets

(51) Int. Cl.
*H01R 13/516* (2006.01)
*H01R 13/66* (2006.01)
*H01R 13/627* (2006.01)

(58) Field of Classification Search
CPC .............. H01R 13/6275; H01R 13/701; H01R 13/6658; H01R 13/521; H01R 13/02; H01R 13/502; H01R 13/665; Y02T 10/70; Y02T 10/7072
See application file for complete search history.

CONNECTOR AND ELECTRONIC DEVICE

PRIORITY CLAIM

This application claims the benefit of and priority to the Chinese Patent Application No. 202110971239.3, filed to the Chinese patent office on Aug. 24, 2021 and entitled "Connector and Electronic Device", which is hereby incorporated by reference in its entirety.

TECHNICAL FIELD

Embodiments of the present disclosure relate to the technical field of connectors, in particular to a connector and an electronic device.

BACKGROUND

At present, with the rapid development of economy in China, a generator set, a test device and products such as a mobile power supply vehicle, a mobile power generation vehicle, a UPS power supply vehicle, a power battery charging pile and an electric vehicle charging pile with electricity as motive power have been widely applied to bring great convenience for the life and production of people, and therefore, a power battery charging connector is needed for high-capacity current transmission within short time.

It was found by the applicant of the present disclosure in a process of implementing the present disclosure that, when the connector is pulled out under the condition that a heavy load is connected, the risks of instant ignition and short circuit easily occur, thereby easily causing the direct scrap of the connector, and even, causing safety accidents.

SUMMARY

According to one aspect of embodiments of the present disclosure, discloses a connector. The connector includes a housing provided with an accommodating cavity and a first opening communicating with the accommodating cavity; a circuit board disposed in the accommodating cavity, the circuit board being provided with a first signal connection point; a connection head disposed on the housing, the connection head including a second signal connection point used to be connected to the external device; and a switch disposed in the first opening, the switch being respectively connected to the first signal connection point of the circuit board and the second signal connection point of the connection head, and the switch being used for controlling the connection or disconnection between the first signal connection point of the circuit board and the second signal connection point of the connection head. The connector includes a first fixing component, the first fixing component is disposed on the housing or the connection head, and the first fixing component is used to be connected to the external device and enables the connector and the external device to be in a primary fixed state. The connector includes a second fixing component, and the second fixing component is connected to the switch. In response to the first signal connection point and the second signal connection point being controlled to be connected by the switch, the switch drives the second fixing component to be matched with the first fixing component or the external device in the primary fixed state to achieve secondary fixation for the external device, so that the external device and the connector are in an undetachable state. In response to the first signal connection point and the second signal connection point being controlled to be disconnected by the switch, the switch drives the second fixing component to be separated from the first fixing component or the external device in the primary fixed state to remove the secondary fixation for the external device, so that the external device and the connector are in a detachable state.

In an optional embodiment, the first fixing component includes a threaded structure or clamping structure disposed on the connection head, the threaded structure or clamping structure is matched with the external device so that the connector and the external device are in a threaded connection or clamped state; the second fixing component includes a connecting arm and a fixing head, the fixing head is disposed on one end of the connecting arm, the other end of the connecting arm is connected to the switch, and the fixing head is used to be fixedly connected to the external device; in response to the first signal connection point and the second signal connection point being controlled to be connected by the switch, the switch drives the fixing head to be fixedly connected to the external device in the threaded connection or clamped state to achieve the secondary fixation for the external device; and in response to the first signal connection point and the second signal connection point being controlled to be disconnected by the switch, the switch drives the fixing head to be separated from the external device in the threaded connection or clamped state to remove the secondary fixation for the external device.

In an optional embodiment, the first fixing component includes a rotating arm and a hook, the rotating arm is rotatably connected to the housing, and the hook is fixed to one end of the rotating arm; the hook and the external device are in the clamped state in a condition that the external device is plugged into the connection head, and the rotating arm is in a first state; the second fixing component includes a limiting and connecting piece, and the limiting and connecting piece is connected to the switch; in response to the first signal connection point and the second signal connection point being controlled to be connected by the switch, the switch drives the limiting and connecting piece to be fixedly connected to and limit the rotating arm in the clamped state, so that the rotating arm is nonrotatable relative to the housing, and then, fixation for the clamped state and the secondary fixation for the external device are achieved; and in response to the first signal connection point and the second signal connection point being controlled to be disconnected by the switch, the switch drives the limiting and connecting piece to be separated from the rotating arm in the clamped state to remove the fixation for the clamped state and the secondary fixation for the external device, so that the rotating arm is rotatable relative to the housing.

In an optional embodiment, the switch includes a switch body and an operation part, the switch body is electrically connected to a power connection point of the circuit board and a power pin of the connection head respectively, the operation part is located in the first opening, is connected to the switch body and is movable relative to the switch body, in response to the operation part located on a first preset position relative to the switch body, the switch body is switched on, in response to the operation part located on a second preset position relative to the switch body, the switch body is switched off, and the limiting and connecting piece is connected to the operation part and moves with the operation part; and when the operation part is located on the first preset position, the limiting and connecting piece supports against and abuts with the other end of a first surface of the rotating arm, the rotating arm is fixed relative to the housing, and in response to the operation part located on the second preset position, the limiting and connecting piece is separated from the other end of the rotating arm, and the rotating arm is rotatable relative to the housing.

In an optional embodiment, the housing is provided with a second opening and a through hole which both communicate with the accommodating cavity, the second opening is located between the connection head and the first opening, the through hole and the connection head are located on the same end of the housing; and the rotating arm is located in the accommodating cavity, one end of the rotating arm extends out of the through hole, the rotating arm is swingable relative to the through hole, the hook is located outside the housing, the other end of the rotating arm is exposed out of the second opening, and the limiting and connecting piece is located in the accommodating cavity.

In an optional embodiment, the first fixing component includes an elastic element, one end of the elastic element is fixed to the other end of the first surface of the rotating arm, and the other end of the elastic element is fixed to the inside of the housing.

In an optional embodiment, a fixing groove is disposed in the other end of the first surface of the rotating arm, and one end of the elastic element is accommodated and fixed inside the fixing groove.

In an optional embodiment, a clamping groove is disposed in the other end of the first surface of the rotating arm, and the clamping groove is used for clamping the limiting and connecting piece.

In an optional embodiment, the other end of a second surface of the rotating arm extends towards the second opening to form a fixing button, the fixing button is movable relative to the second opening, wherein the first surface is opposite to the second surface.

In an optional embodiment, the first signal connection point includes an electric signal connection point and a communication signal connection point; the connection head includes a plurality of electric signal pins and a plurality of communication signal pins, the plurality of electric signal pins are connected to the electric signal connection point of the first signal connection point, the plurality of communication signal pins are connected to the communication signal connection point of the first signal connection point, the number of the plurality of electric signal pins is two, and the number of the plurality of communication signal pins is eight.

In an optional embodiment, an anti-skid bulge is disposed on the outer side wall of the housing.

According to the other aspect of the embodiments of the present disclosure, discloses an electronic device. The electronic device includes the above-mentioned connector.

BRIEF DESCRIPTION OF THE DRAWINGS

In order to describe the specific embodiments of the present disclosure or the technical solutions in the prior art more clearly, the accompanying drawings required for describing the specific embodiments or the prior art will be briefly introduced below. In all the accompanying drawings, similar elements or parts are generally marked with similar numerals. In the accompanying drawings, all the elements or parts are not necessarily drawn according to an actual proportion.

DETAILED DESCRIPTION

For facilitating understanding the present disclosure, the present disclosure will be described below in more detail with reference to the accompanying drawings and the specific embodiments. It needs to be noted that when one element is stated as "fixed to" another element, the element may be directly located on another element, or one or more centered elements may exist therebetween. When one element is stated as "connected to" another element, the element may be directly connected to another element, or one or more centered elements may exist therebetween. Terms "vertical", "horizontal", "left", "right" and similar expressions used in the present description are merely for the purpose of description.

Unless defined otherwise, all technical and scientific terms used in the present description have the same meaning as commonly understood by the ordinary skill in the art to which this technology belongs. In the present description, the terms used in the description of the present disclosure are merely for the purpose of describing specific embodiments, rather than to limit the present disclosure. The term "and/or" used in the present description includes any or all of combinations of one or more listed relevant items.

Figure 1:
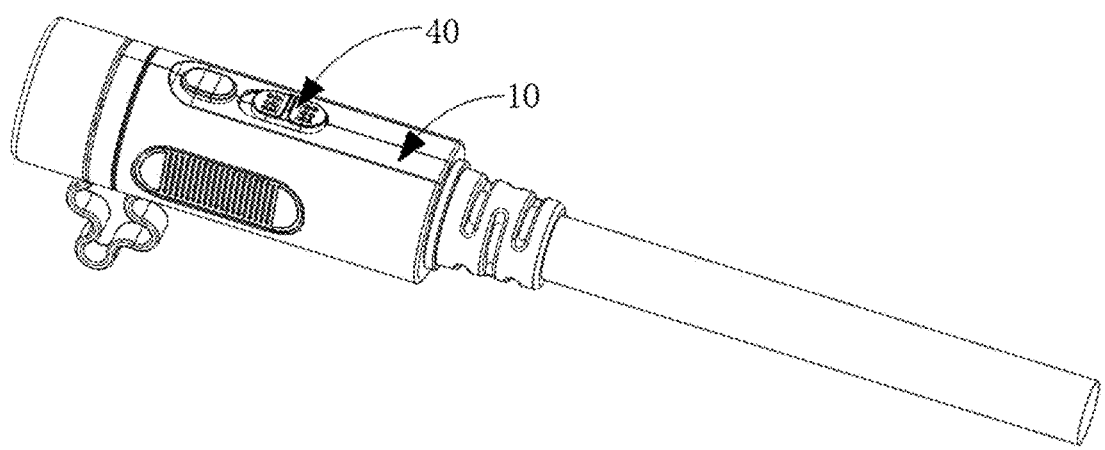
FIG. 1 is a schematic view showing an overall structure of a connector according to an embodiment of the present disclosure.
Figure 2:
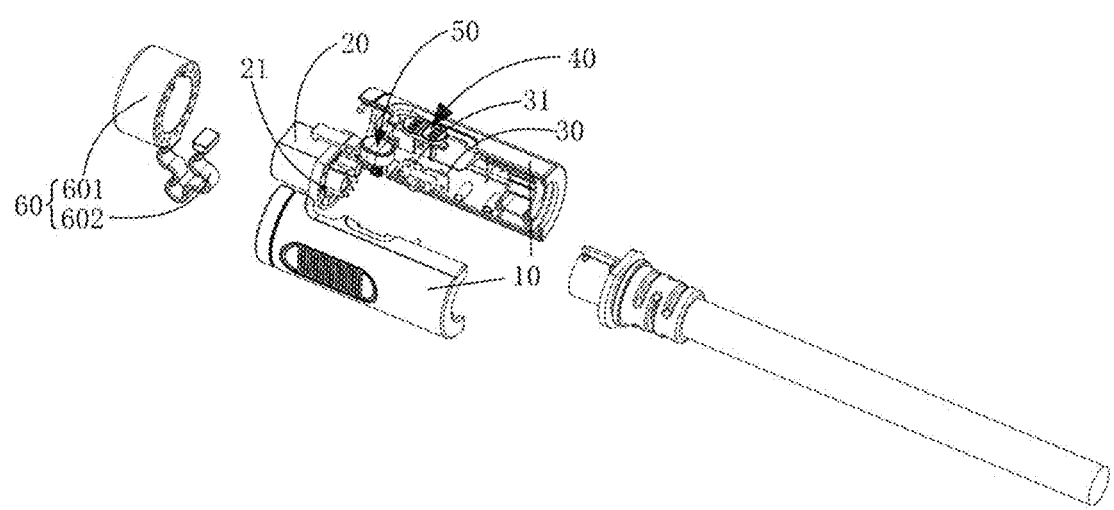
FIG. 2 is a schematic exploded view showing the overall structure of the connector according to the embodiment of the present disclosure.

With reference to FIG. 1 and FIG. 2, a connector 01 includes a housing 10, a connection head 20, a circuit board 30, a switch 40, a first fixing component 50 and a protection component 60. The connection head 20 is disposed on one end of the housing 10, the circuit board 30 is disposed in the housing 10, both of the first fixing component 50 and the protection component 60 are connected to the housing 10, and the switch 40 is disposed on the housing 10 and is connected to the connection head 20 and the circuit board 30. The switch 40 is used for controlling the electric connection or disconnection between the connection head 20 and the circuit board 30, and the first fixing component 50 is used to be connected to an external device and enables the connector and the external device to be in a primary fixed state (a primary stable connection state).

Figure 3:
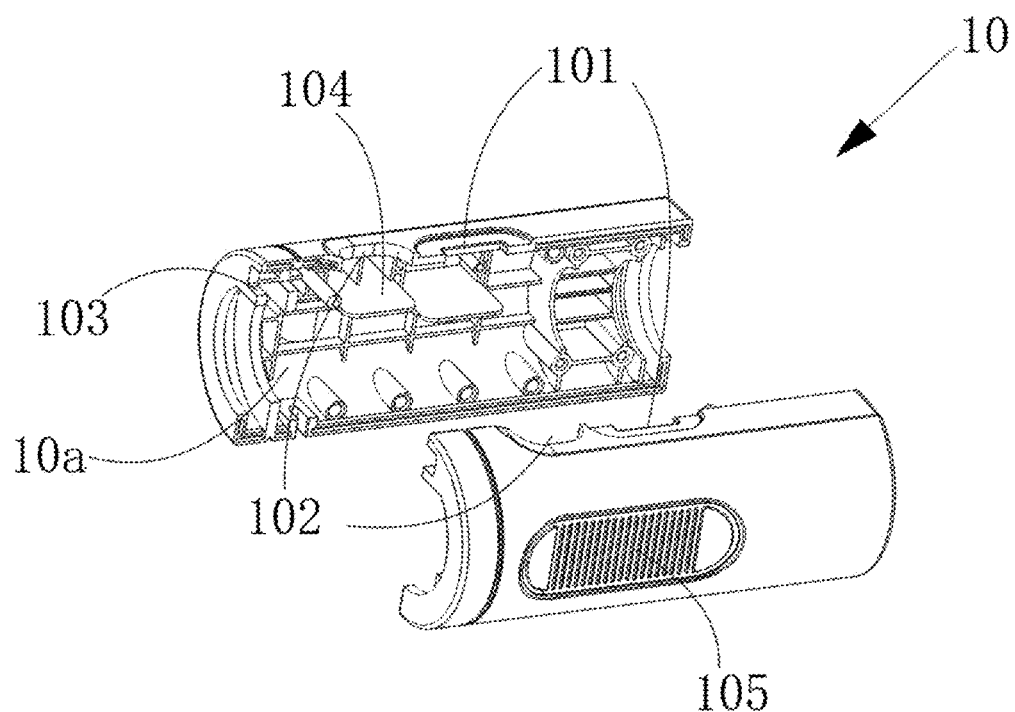
FIG. 3 is a schematic exploded view showing a housing structure of the connector according to the embodiment of the present disclosure.

Specifically, for the above-mentioned housing 10, as shown in FIG. 2 and FIG. 3, the housing 10 is provided with an accommodating cavity 10a and a first opening 101 communicating with the accommodating cavity 10a, the accommodating cavity 10a may be used for accommodating the circuit board 30, and the first opening 101 is used for mounting the switch 40.

In some embodiments, the housing 10 is provided with a second opening 102, and the second opening 102 communicates with the accommodating cavity 10a. The second opening 102 is located between the connection head 20 and the first opening 101 and facilitates a user controlling the first fixing component 50.

In some embodiments, the housing 10 is provided with a through hole 103 communicating with the accommodating cavity 10a, the through hole 103 and the connection head 20 are located on the same end of the housing 10, and the through hole 103 allows parts of component of the first fixing component 50 to penetrate to fix the external device.

In some embodiments, a supporting plate 104 is disposed in the housing 10 and is used for fixing the parts of components of the first fixing component 50.

In some embodiments, an anti-skid bulge 105 is disposed on the outer side wall of the housing 10. When a user holds the connector, the anti-skid bulge 105 may play an anti-skid role to reduce the phenomenon that the connector falls off from a hand of the user, thereby reducing the damage of the connector.

Figure 4:
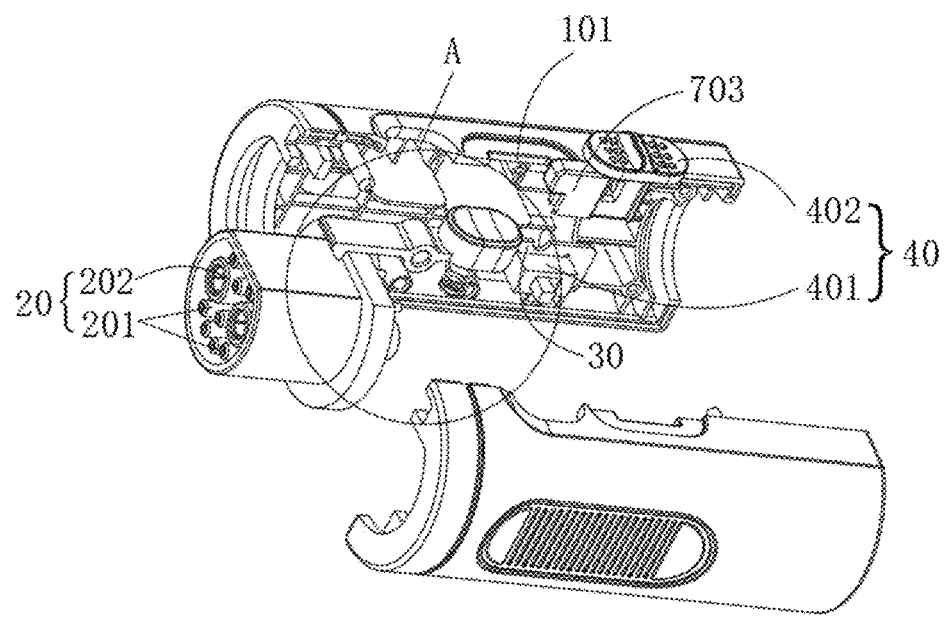
FIG. 4 is a schematic exploded view showing a partial structure of the connector according to the embodiment of the present disclosure.

For the above-mentioned circuit board 30, as shown in FIG. 4, the circuit board 30 is disposed in the accommodating cavity 10a and as shown in FIG. 2, the circuit board is provided with a first signal connection point 31, and the first signal connection point includes, but is not limited to: an electric signal connection point and a communication signal connection point. The electric signal connection point facilitates electric connection between the circuit board and the connection head, and the communication signal connection point facilitates communication signal connection between the circuit board 30 and the connection head 20.

In some embodiments, the circuit board 30 is a PCB which may be used as a carrier of an electronic component, thereby being beneficial to the connection among components inside the connector.

For the above-mentioned connection head 20, as shown in FIG. 4, the connection head 20 is disposed on the housing 10. As shown in FIG. 2, the connection head 20 includes a second signal connection point 21 connected to the external device, the second signal connection point includes, but is not limited to an electric signal connection point and a communication signal connection point, the electric signal connection point of the second signal connection point is used to be connected to the electric signal connection point of the first signal connection point, and the communication signal connection point of the second signal connection point is used to be connected to the communication signal connection point of the first signal connection point.

The connection head 20 includes communication signal pins 201 and electric signal pins 202, the communication signal pins 201 are connected to the communication signal connection point of the first signal connection point, the electric signal pins 202 are connected to the electric signal connection point of the first signal connection point, the communication signal pins 201 may be connected to the communication signal connection point of the circuit board 30 under the control of the switch 40, and the electric signal pins 202 are connected to the electric signal connection point of the circuit board 30 under the control of the switch 40. The communication signal pins 201 and the electric signal pins 202 are used to be connected to an external component by a signal, thereby achieving connection between the external component and the communication signal connection point and the electric signal connection point on the circuit board 30.

In some embodiments, the number of the communication signal pins 201 and the electric signal pins 202 is multiple, the number of the plurality of communication signal pins 201 is eight, and the number of the electric signal pins 202 is two.

For the above-mentioned switch 40, as shown in FIG. 4, the switch 40 is disposed in the first opening 101, and the switch 40 is respectively connected to the first signal connection point (including the electric signal connection point and the communication signal connection point) of the circuit board 30 and the second signal connection point (including the electric signal connection point and the communication signal connection point) of the connection head 20, and the switch 40 is used for controlling the connection or disconnection between the first signal connection point of the circuit board 30 and the second signal connection point of the connection head 20.

It may be understood that the switch 40 may be used for controlling the connection or disconnection between the electric signal connection point of the first signal connection point and the electric signal connection point of the second signal connection point. In some embodiments, the switch 40 may be further used for controlling the connection or disconnection between the communication signal connection point of the first signal connection point and the communication signal connection point of the second signal connection point.

Specifically, the switch 40 includes a switch body 401 and an operation part 402; the switch body 401 is electrically connected to the first signal connection point of the circuit board 30 and the second signal connection point of the connection head 20, the operation part 402 is located in the first opening 101, is connected to the switch body 401 and is movable relative to the switch body 401; in response to the operation part 402 located on a first preset position relative to the switch body 401, the switch body 401 is switched on to achieve the signal connection between the first signal connection point of the circuit board 30 and the second signal connection point of the connection head 20; and in response to the operation part 402 located on a second preset position relative to the switch body 401, the switch body 401 is switched off to achieve the signal disconnection between the first signal connection point of the circuit board 30 and the second signal connection point of the connection head 20.

In some embodiments, the operation part 402 is a sliding seat which slides relative to the housing 10 to control the switch body 401 to be switched on or off, when the sliding seat slides to the first preset position, the switch body 401 is switched on, and meanwhile, a limiting and connecting piece 703 is matched with the first fixing component 50, thereby achieving fixation for the state of the first fixing component 50; and when the sliding seat slides to the second preset position, the switch body 401 is switched off, and the limiting and connecting piece 703 and the first fixing component 50 are disconnected.

Figure 5:
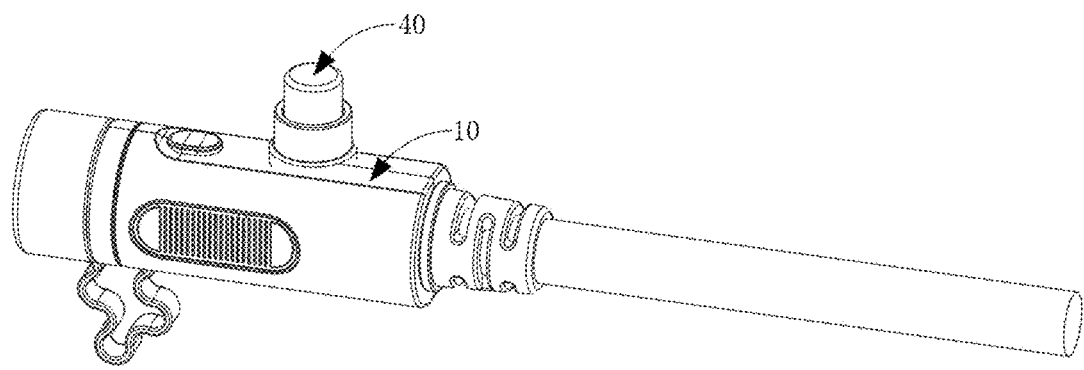
FIG. 5 is a schematic view showing an overall structure of the connector according to another embodiment of the present disclosure.
Figure 6:
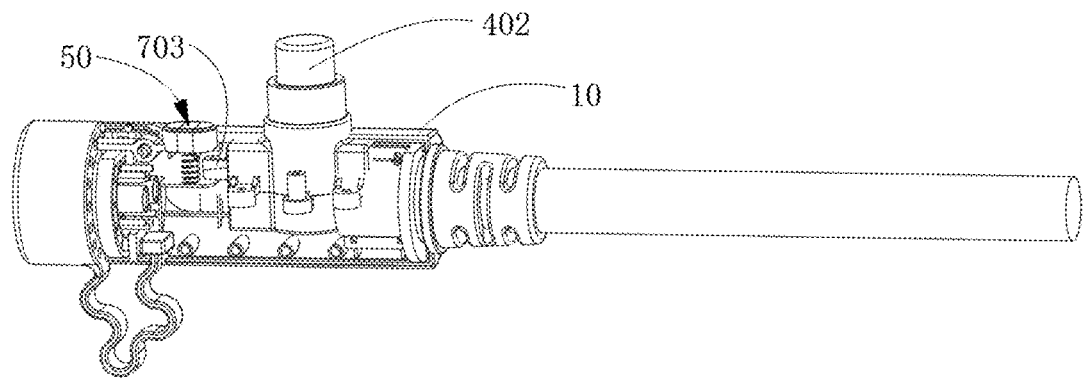
FIG. 6 is a partially sectional view showing the overall structure of the connector according to another embodiment of the present disclosure.

It may be understood that the operation part 402 is not limited to the structure of the above-mentioned sliding seat and may also be other structures. For example, as shown in FIG. 5 and FIG. 6, the operation part 402 is a button, it is set that the button is located on the first preset position when being in a pressing state, and the limiting and connecting piece 703 upwards moves and is matched with the first fixing component 50 in the primary fixed state; and it is set that the button is located on the second preset position when being in a springback state, and the limiting and connecting piece 703 downwards moves and is disconnected with the first fixing component 50 in the primary fixed state. It needs to be noted that the purpose of ensuring that the limiting and connecting piece 703 upwards moves during the button in the pressing state and the limiting and connecting piece 703 downwards moves during the button in the springback state may be achieved in a manner including, but not limited to a lever structure.

Figure 11:
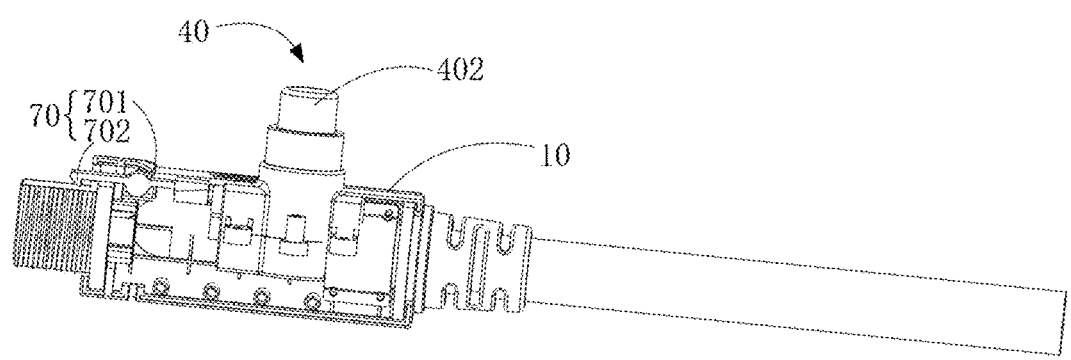
FIG. 11 is a sectional view showing a partial structure of the connector according to another embodiment of the present disclosure.

The connector further includes a second fixing component 70 connected to the switch 40. As shown in FIG. 4 and FIG. 11, the second fixing component 70 includes a limiting and connecting piece 703; and the limiting and connecting piece 703 is connected to the operation part 402 and moves with the operation part 402. The limiting and connecting piece 703 is used to be matched with the first fixing component 50 in the primary fixed state when the operation part 402 is toggled to the first preset position, so that fixation for the state of the first fixing component 50 is achieved, and the connection of the external device and the connector is further in a secondary stable state, that is, the external device is secondarily fixed to ensure that the connector and the external device are in a stable connection and undetachable state when being powered on. When the operation part 402 moves to the second preset position, the limiting and connecting piece 703 is separated from the first fixing component 50 in the primary fixed state to remove the fixation for the state of the first fixing component 50, so that it is further ensured that electric signal connection between the connector and the external device is in a cutoff state before the connector and the external device are to be detached, the risk of ignition or short circuit is avoided, that is, before the primary fixation of the connector and the external device, the secondary fixation has to be removed, and meanwhile, an electric signal is cut off. Optionally, the limiting and connecting piece 703 is located in the accommodating cavity 10*a*.

In some embodiments, as shown in FIG. 4, the limiting and connecting piece 703 is connected to the switch 40; in response to the switch 40 located on the first preset position, the limiting and connecting piece 703 is matched with the first fixing component 50, so that the first fixing component 50 is in a fixed state relative to the housing 10; and in response to the switch 40 located on the second preset position, the limiting and connecting piece 703 is separated from the first fixing component 50, so that the first fixing component 50 is movable relative to the housing.

Figure 7:
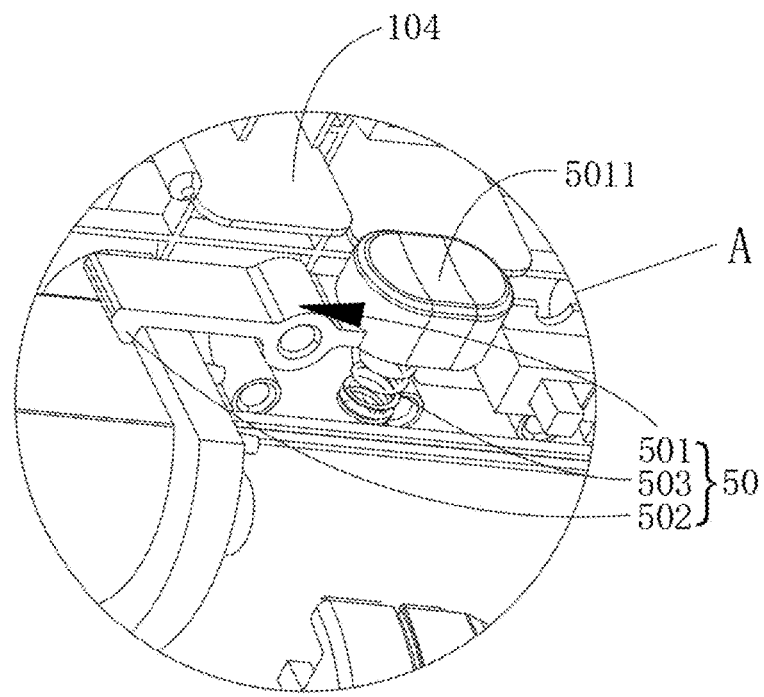
FIG. 7 is a schematic enlarged view showing a structure at part A in FIG. 4.

For the above-mentioned first fixing component 50, as shown in FIG. 4 and FIG. 7, the first fixing component 50 is disposed on the housing 10. The first fixing component 50 includes a rotating arm 501, a hook 502 and an elastic element 503; the rotating arm 501 is rotatably connected to the housing 10; the hook 502 is fixed to one end of the first surface of the rotating arm 501; one end of the elastic element 503 is fixed to the other end of the first surface of the rotating arm 501, and the other end of the elastic element 503 is fixed to the supporting plate 104 in the housing 10; and after the other end of the first surface of the rotating arm 501 rotates, the springback of the other end of the first surface of the rotating arm 501 may be achieved by the elastic element 503. It should be noted that the first surface refers to the surface, close to one side of the connection head 20, of the rotating arm 501. The hook 502 is used to clamp the external device and stabilize the physical connection between the connector and the external device when the external device is plugged into the connection head 20, and when the operation part 402 of the switch 40 is located on the first preset position, that is, the switch 40 controls the first signal connection point and the second signal connection point to be connected, the limiting and connecting piece 703 supports against and abuts with the other end of the first surface of the rotating arm 501, the limiting and connecting piece 703 is connected to and limits the rotating arm 501 in the clamped state to fix a first state of the rotating arm, so that the rotating arm 501 is nonrotatable relative to the housing 10, and then, the secondary fixation for the external device is achieved; and when the operation part 402 of the switch 40 is located on the second preset position, that is, the switch 40 controls the first signal connection point and the second signal connection point to be disconnected, the limiting and connecting piece 703 is separated from the other end of the rotating arm 501, the limiting and connecting piece 703 is separated from the rotating arm 501 in the clamped state to remove the fixation for the state of the rotating arm 501, so that the rotating arm 501 is rotatable relative to the housing 10, at the moment, the primary fixation of the connector and the external device has not been removed, but the secondary fixation for the external device has been removed, and meanwhile, the electric signal has been cut off.

It may be understood that a connection manner between the limiting and connecting piece 703 and the rotating arm 501 is not limited to supporting and abutting and may be other connection manners, such as clamping and threaded connection, as long as the rotating arm 501 is fixed relative to the housing 10 after the limiting and connecting piece 703 is connected to the other end of the rotating arm 501.

In some embodiments, the hook 502 is located outside the housing 10 and is clamped with the part, located outside the housing 10, of the external device, thereby achieving connection and fixation for the overall external device.

Figure 8:
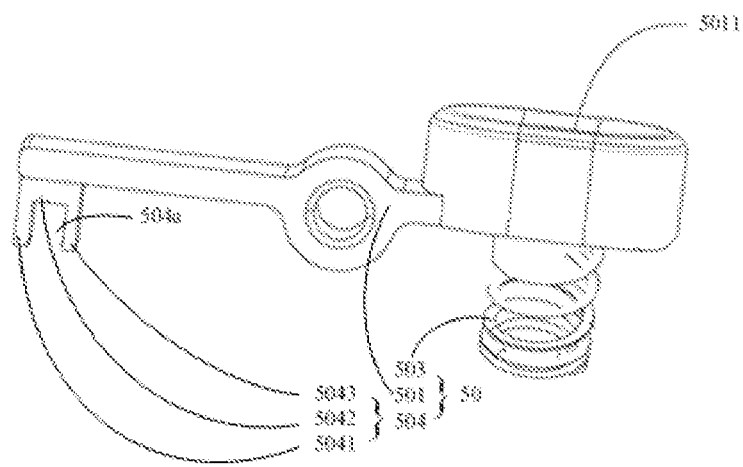
FIG. 8 is a schematic view showing an overall structure of a first fixing component of the connector according to another embodiment of the present disclosure.

It should be understood that a structure for achieving fixation for the external device is not limited to the structure of the above-mentioned hook 502, and may also be other structures. For example, as shown in FIG. 8, the hook is replaced with a fixing piece 501 including a first fixing plate 5041, a connecting plate 5042 and a second fixing plate 5043, one end of the first fixing plate 5041 is connected to one end of the connecting plate 5042, one end of the second fixing plate 5043 is connected to the other end of the connecting plate 5042, the fixing piece 504 is U-shaped, the first fixing plate 5041 and the second fixing plate 5043 are spaced to form a fixing groove 504*a*, and the fixing groove 504*a* may be used to be clamped in the external device and the connection head 20, thereby achieving connection and fixation for the external device.

Figure 9:
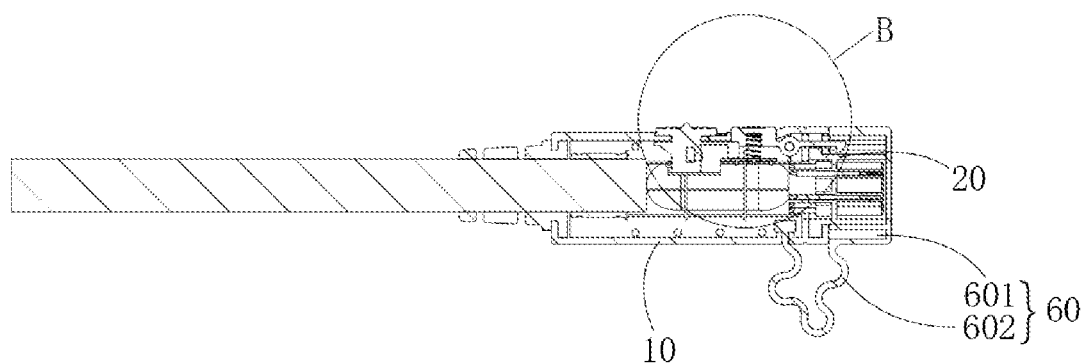
FIG. 9 is a sectional view showing a side of the connector according to the embodiment of the present disclosure.
Figure 10:
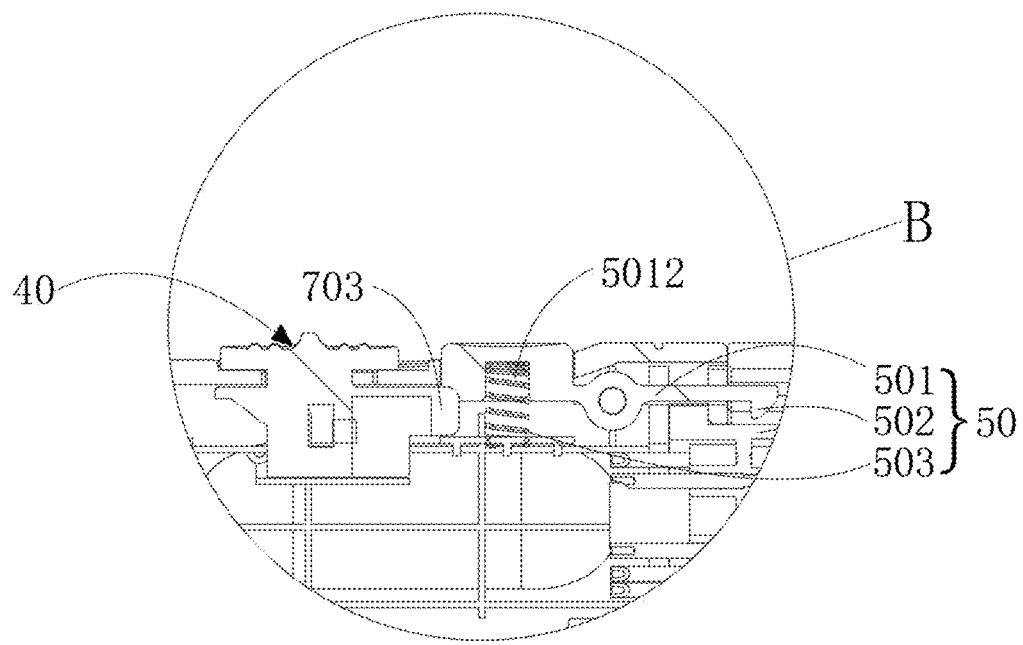
FIG. 10 is a schematic enlarged view showing a structure at part B in FIG. 9.

In some embodiments, as shown in FIG. 7, FIG. 9 and FIG. 10, the rotating arm 501 is located in the accommodating cavity 10*a*, one end of the rotating arm 501 extends out of the through hole 103, the rotating arm 501 is swingable relative to the through hole 103, the other end of the rotating arm 501 is exposed out of the second opening 102, and a user may directly press the other end of the rotating arm 501 at the second opening 102 to make the rotating arm 501 rotate, and thus, the disconnection or connection between the hook 502 disposed on one end of the rotating arm 501 and the external device may be achieved, and the external device may be freely disconnected or connected to the connection head 20.

In some embodiments, a fixing groove 5012 is disposed in the other end of the first surface of the rotating arm 501, and the fixing groove 5012 is used to accommodate and fix one end of the elastic element 503.

In some embodiments, a clamping groove (unshown) is disposed in the other end of the first surface of the rotating arm 501, and the clamping groove is used for clamping the limiting and connecting piece 703 to limit the rotation of the rotating arm 501, and the rotating arm 501 is fixed relative to the housing 10.

In some embodiments, the other end of a second surface of the rotating arm 501 extends towards the second opening 102 to form a fixing button 5011, and the fixing button 5011 is movable relative to the second opening 102. By pressing the fixing button 5011, the rotating arm 501 is driven to rotate, and thus, the disconnection or connection between the hook 502 disposed on one end of the rotating arm 501 and the external device may be achieved, and the external device may be freely disconnected or connected to the connection head 20. It should be noted that the second surface is opposite to the first surface, and the second surface refers to the surface, away from one side of the connection head 20, of the rotating arm 501.

In some other embodiments, the first fixing component 50 and the second fixing component 70 are not limited to the structures as shown in FIG. 1 to FIG. 10, and may also adopt other manners. As shown in FIG. 11, the first fixing component 50 includes a threaded structure or clamping structure disposed on the connection head, the threaded structure or clamping structure is matched with the external device so that the connector and the external device are in a primary fixed state of threaded connection or clamping. The second fixing component 70 includes a connecting arm 701 and a fixing head 702, the fixing head 702 is disposed on one end of the connecting arm 701, and the other end of the connecting arm 701 is connected to the switch 40.

After the threaded connection or clamping between the connection head of the connector and the external device is completed, in response to the first signal connection point and the second signal connection point being controlled to be connected by the switch, the switch 40 drives the connecting arm 701 to move to a direction close to the connection head 20, and the fixing head 702 is fixedly connected to the external device to secondarily fix the external device in the primary fixed state (threaded connection or clamped state), so that the external device and the connector are undetachable. In response to the first signal connection point and the second signal connection point being controlled to be disconnected by the switch, the switch 40 drives the connecting arm 701 to move to a direction away from the connection head 20, and the fixing head 702 is separated from the external device to remove the secondary fixed state of the external device, at the moment, the external device and the connection head 20 are detachable. It may be understood that the connecting arm 701 and the switch 40 may be fixed in a manner such as welding and threaded connection.

For the above-mentioned protection component 60, as shown in FIG. 2, the protection component 60 includes a protection cover 601 and an elastic connecting piece 602, one end of the elastic connecting piece 602 is connected to the housing 10, the other end of the elastic connecting piece 602 is connected to the protection cover 601, and the protection cover 601 covers the connection head 20. When the connector is in an unused state, the protection cover 601 covers the connection head 20, so that the phenomenon that the communication signal pins 201 and the electric signal pins 202 in the connection head 20 are exposed in the air and are in contact with water in the air is reduced.

In an embodiment of the present disclosure, the housing 10, the circuit board 30, the connection head 20 and the switch 40 are disposed, wherein the housing 10 is provided with the accommodating cavity 10a and the first opening 101 communicating with the accommodating cavity 10a, the circuit board 30 is disposed in the accommodating cavity 10a and is provided with the first signal connection point, and the connection head 20 is disposed on the housing 10 and is provided with a second signal connection point used to be connected to the external device; in addition, the switch 40 is disposed in the first opening 101, is respectively connected to the first signal connection point of the circuit board 30 and the second signal connection point of the connection head 20 and is used for controlling the connection or disconnection between the first signal connection point of the circuit board 30 and the second signal connection point of the connection head 20. Under the condition that the connector is connected to a heavy load, before a user pulls out the connector, signal connection between the circuit board 30 and the connection head 20 is only required to be cut off by means of the switch 40, that is, the connector and the heavy load are disconnected, so that risks of instant ignition and short circuit caused when the connector is pulled out are avoided, and safety accidents are reduced.

By disposing the first fixing component 50 used to be stably connected to the external device on the connector and disposing the second fixing component 70 on the switch 40, when the switch 40 controls the first signal connection point and the second signal connection point to be connected, the second fixing component 70 is matched with the first fixing component in the primary fixed state, so that the connection between the external device and the connector is in a secondary stable state to ensure that the connector and the external device are in a stable connection and undetachable state when being powered on. When the switch 40 controls the first signal connection point and the second signal connection point to be disconnected, the second fixing component 70 is separated from the first fixing component 50 in the primary fixed state to remove the fixation for the state of the first fixing component, so that it is further ensured that a signal (particularly, an electric signal) between the connector and the external device is in a cutoff state before the connector and the external device are detached, and the risk of ignition or short circuit is avoided.

When the connector is required to be connected to the external device (a heavy-load device or a power source), firstly, the connection head 20 of the connector is connected to the external device, then, the external device is subjected to primary stable fixation by the first fixing assembly 50, and then, the switch 40 is switched on, so that signal communication (electric connection and the like) between the heavy load and the connector is achieved, meanwhile, the state of the first fixing component 50 is fixed by the second fixing component 70, and the connector is stably connected to the external device and is undetachable. When the connector is required to be detached to be disconnected with the external device, the switch 40 has to be firstly switched off to cut off the signal connection between the heavy load and the connector and remove the fixation for the state of the first fixing component 50 at the same time, and thus, the connector is subsequentially allowed to be detached from the external device.

The present disclosure further provides an embodiment of an electronic device. The electronic device includes the above-mentioned connector 01, and the function and structure of the connector 01 may refer to those in the above-mentioned embodiments, the descriptions thereof are omitted herein.

The above descriptions are not intended to limit the patent scope of the present disclosure, but merely used as embodiments thereof. All equivalent structure or equivalent process transformations made according to the contents of the description and the accompanying drawings in the present disclosure, no matter whether they are directly or indirectly used in other related technical fields, should fall within the patent protection scope of the present disclosure in a similar way.

What is claimed is:

1. A connector applied to connection to an external device, comprising:
a housing provided with an accommodating cavity and a first opening communicating with the accommodating cavity;
a circuit board disposed in the accommodating cavity; the circuit board being provided with a first signal connection point;
a connection head disposed on the housing, the connection head comprising a second signal connection point used to be connected to the external device; and
a switch disposed in the first opening, the switch being respectively connected to the first signal connection point of the circuit board and the second signal connection point of the connection head, and the switch being used for controlling the connection or disconnection between the first signal connection point of the circuit board and the second signal connection point of the connection head;
wherein the connector comprises a first fixing component, the first fixing component is disposed on the housing or the connection head, and the first fixing component is used to be connected to the external device and enables the connector and the external device to be in a primary fixed state;
the connector comprises a second fixing component, and the second fixing component is connected to the switch;
in response to the first signal connection point and the second signal connection point being controlled to be connected by the switch, the switch drives the second fixing component to be matched with the first fixing component or the external device in the primary fixed state to achieve secondary fixation for the external device, so that the external device and the connector are in an undetachable state; and
in response to the first signal connection point and the second signal connection point being controlled to be disconnected by the switch, the switch drives the second fixing component to be separated from the first fixing component or the external device in the primary fixed state to remove the secondary fixation for the external device, so that the external device and the connector are in a detachable state.

2. An electronic device, comprising the connector according to claim 1.

3. The connector according to claim 1, wherein
the first fixing component comprises a rotating arm and a hook, the rotating arm is rotatably connected to the housing, and the hook is fixed to one end of the rotating arm; the hook and the external device are in the clamped state in a condition that the external device is plugged into the connection head, and the rotating arm is in a first state;

the second fixing component comprises a limiting and connecting piece, and the limiting and connecting piece is connected to the switch;
in response to the first signal connection point and the second signal connection point being controlled to be connected by the switch, the switch drives the limiting and connecting piece to be connected to and limit the rotating arm in the clamped state, so that the rotating arm is nonrotatable relative to the housing, and fixation for the clamped state and the secondary fixation for the external device are achieved; and
in response to the first signal connection point and the second signal connection point being controlled to be disconnected by the switch, the switch drives the limiting and connecting piece to be separated from the rotating arm in the clamped state to remove the fixation for the clamped state and the secondary fixation for the external device, so that the rotating arm is rotatable relative to the housing.

4. An electronic device, comprising the connector according to claim 3.

5. The connector according to claim 3, wherein
the switch comprises a switch body and an operation part, the switch body is electrically connected to a power connection point of the circuit board and a power pin of the connection head respectively, the operation part which is located in the first opening is connected to the switch body and movable relative to the switch body, in response to the operation part located on a first preset position relative to the switch body, the switch body is switched on, in response to the operation part located on a second preset position relative to the switch body, the switch body is switched off, and the limiting and connecting piece is connected to the operation part and moves with the operation part; and
in response to the operation part located on the first preset position, the limiting and connecting piece supports against and abuts with the other end of a first surface of the rotating arm, the rotating arm is fixed relative to the housing, and in response to the operation part located on the second preset position, the limiting and connecting piece is separated from the other end of the rotating arm, and the rotating arm is rotatable relative to the housing.

6. An electronic device, comprising the connector according to claim 5.

7. The connector according to claim 5, wherein
the housing is provided with a second opening and a through hole which both communicate with the accommodating cavity, the second opening is located between the connection head and the first opening, the through hole and the connection head are located on the same end of the housing; and
the rotating arm is located in the accommodating cavity, one end of the rotating arm extends out of the through hole, the rotating arm is swingable relative to the through hole, the hook is located outside the housing, the other end of the rotating arm is exposed out of the second opening, and the limiting and connecting piece is located in the accommodating cavity.

8. An electronic device, comprising the connector according to claim 7.

9. The connector according to claim 7, wherein the first fixing component comprises an elastic element, one end of the elastic element is fixed to the other end of the first surface of the rotating arm, and the other end of the elastic element is fixed inside the housing.

10. An electronic device, comprising the connector according to claim 9.

11. The connector according to claim 1, wherein the first fixing component comprises a threaded structure or clamping structure disposed on the connection head, the threaded structure or clamping structure is matched with the external device so that the connector and the external device are in a threaded connection or clamped state;

the second fixing component comprises a connecting arm and a fixing head, the fixing head is disposed on one end of the connecting arm, the other end of the connecting arm is connected to the switch, and the fixing head is used to be fixedly connected to the external device;

in response to the first signal connection point and the second signal connection point being controlled to be connected by the switch, the switch drives the fixing head to be fixedly connected to the external device in the threaded connection or clamped state to achieve the secondary fixation for the external device; and in response to the first signal connection point and the second signal connection point being controlled to be disconnected by the switch, the switch drives the fixing head to be separated from the external device in the threaded connection or clamped state to remove the secondary fixation for the external device.

12. An electronic device, comprising the connector according to claim 11.

13. The connector according to claim 9, wherein a fixing groove is disposed in the other end of the first surface of the rotating arm, and one end of the elastic element is accommodated and fixed inside the fixing groove.

14. An electronic device, comprising the connector according to claim 13.

15. The connector according to claim 7, wherein the other end of a second surface of the rotating arm extends towards the second opening to form a fixing button, the fixing button is movable relative to the second opening, wherein the first surface is opposite to the second surface.

16. An electronic device, comprising the connector according to claim 15.

17. The connector according to claim 1, wherein the first signal connection point comprises an electric signal connection point and a communication signal connection point, the connection head comprises a plurality of electric signal pins and a plurality of communication signal pins, the plurality of electric signal pins are connected to the electric signal connection point of the first signal connection point, the plurality of communication signal pins are connected to the communication signal connection point of the first signal connection point, the number of the plurality of electric signal pins is two, and the number of the plurality of communication signal pins is eight.

18. An electronic device, comprising the connector according to claim 17.

* * * * *